July 10, 1928.

R. E. SCHLEY

MECHANICAL MOVEMENT

Filed April 30, 1926

INVENTOR.
Rudolph E Schley
BY
Erwin, Wheeler & Woolard
ATTORNEYS

July 10, 1928.

R. E. SCHLEY 1,676,506

MECHANICAL MOVEMENT

Filed April 30, 1926

INVENTOR.
Rudolph E. Schley
BY
Erwin, Wheeler & Woolard
ATTORNEYS.

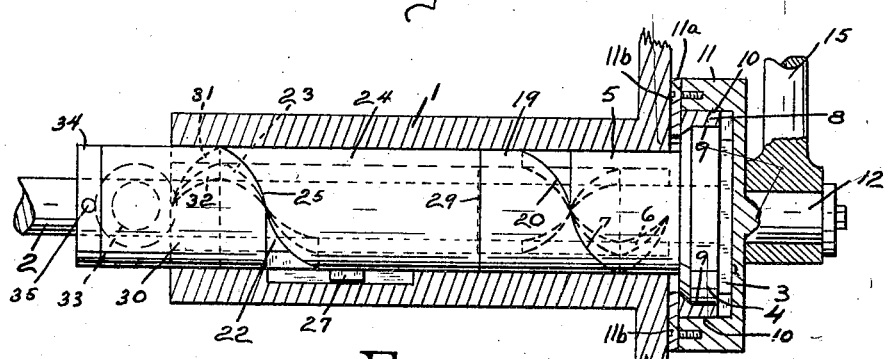
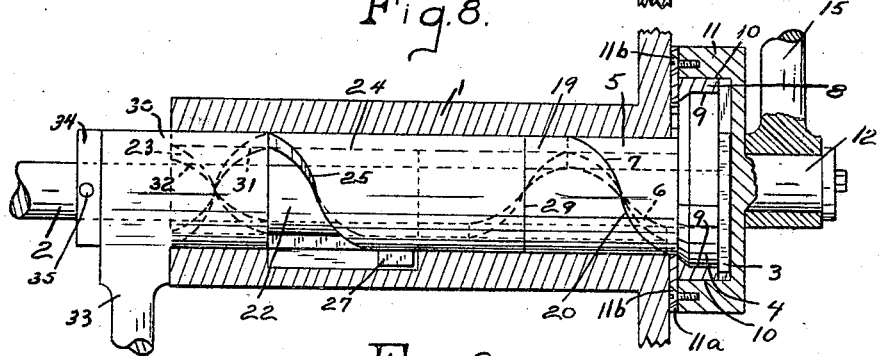
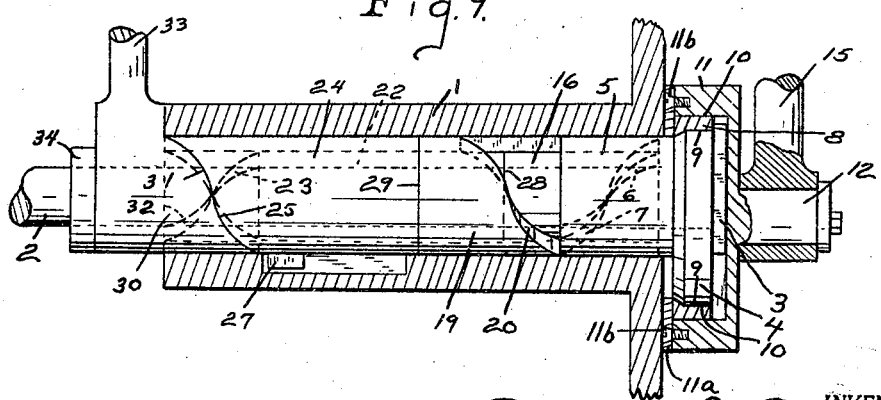

Patented July 10, 1928.

1,676,506

UNITED STATES PATENT OFFICE.

RUDOLPH E. SCHLEY, OF BEAVER DAM, WISCONSIN.

MECHANICAL MOVEMENT.

Application filed April 30, 1926. Serial No. 105,661.

This invention relates to improvements in mechanical movements. The invention is particularly adapted for use in the reciprocation of parts subject to rotation. For example, it may be used to adjust a crank pin during shaft rotation or while the shaft is at rest.

This application is a continuation in part of my application for United States Letters Patent for fluid power transmissions, Serial No. 475,272, filed June 6, 1921.

It is the principal object of this invention to provide means for adjusting reciprocable or oscillatable mechanism carried by a rotatable shaft and adapted to permit such adjustment under all conditions of shaft operation.

Another object is to provide for a rotatable shaft having an eccentric or cam rotatably mounted thereon, means slidable axially of the shaft and adapted to rotate the eccentric or cam relative to the shaft while maintaining the eccentric or cam in operative connection with the shaft during rotation thereof.

In the drawings:

Figure 7 is a view showing a modified construction of the adjustable means.

Figure 8 is a view similar to Figure 7 showing the modified form in one position of adjustment.

Figure 9 is a view similar to Figure 7 showing the modified form in another position of adjustment.

Like parts are identified by the same reference characters throughout the several views.

Figure 1:
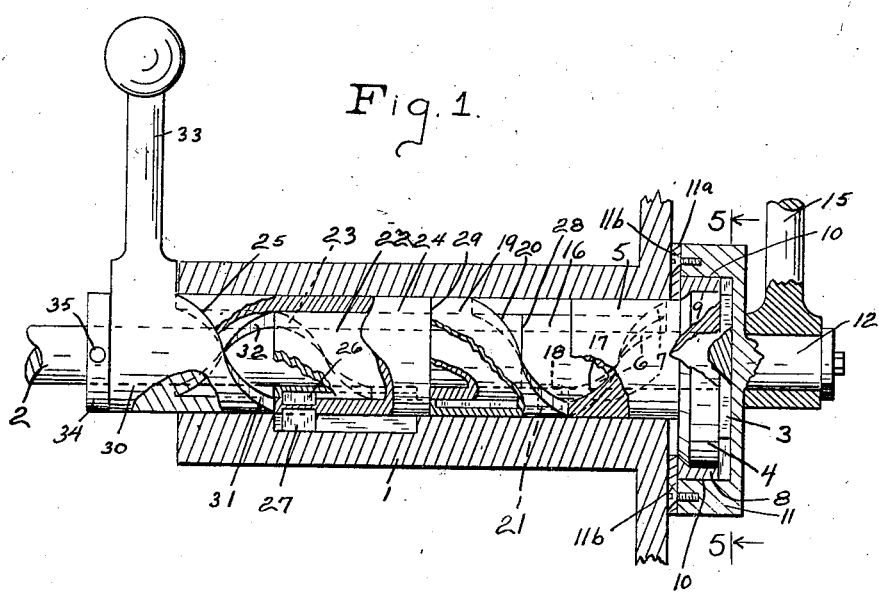
Figure 1 is a fragmentary sectional view showing the means for adjusting the reciprocable or oscillatable mechanism.

Extending through a stationary bearing or casing 1 is a shaft 2 provided at one end with a squared or rectangular block 3 disposed radially of the shaft and secured thereto in any suitable manner, preferably integrally. Adjacent the block 3 and rotatably mounted upon the shaft 2 is an eccentric or cam 4 having a sleeve 5 provided with a pair of cam surfaces 6 and 7, the former of which is adjacent the shaft 2 and the latter of which is adjacent the outer periphery of the sleeve 5 and upon the opposite side thereof from the cam surface 6. Sleeve 5 in the present case is shown as rotatably journaled in the stationary bearing on casing 1.

The eccentric or cam 4 is rotatably journaled in the member 8 having parallel outer surfaces 9 slidably bearing upon corresponding parallel surfaces 10 within the circular member or disk 11. The disk 11 is provided with a crank pin 12, a recess 13 within which the member 8 may reciprocate, and a slot 14 wherein the block 3 is slidably mounted to permit the disk 11 to move radially of the shaft 2. Carried by the crank pin 12 is a crank rod 15 which may be connected with a piston or other reciprocable member, not shown. A disk or plate 11$^a$ may be secured by screws 11$^b$ to the disk 11 for the purpose of holding the cam 4, member 8 and disk 11 in proper relative position.

Figure 2:
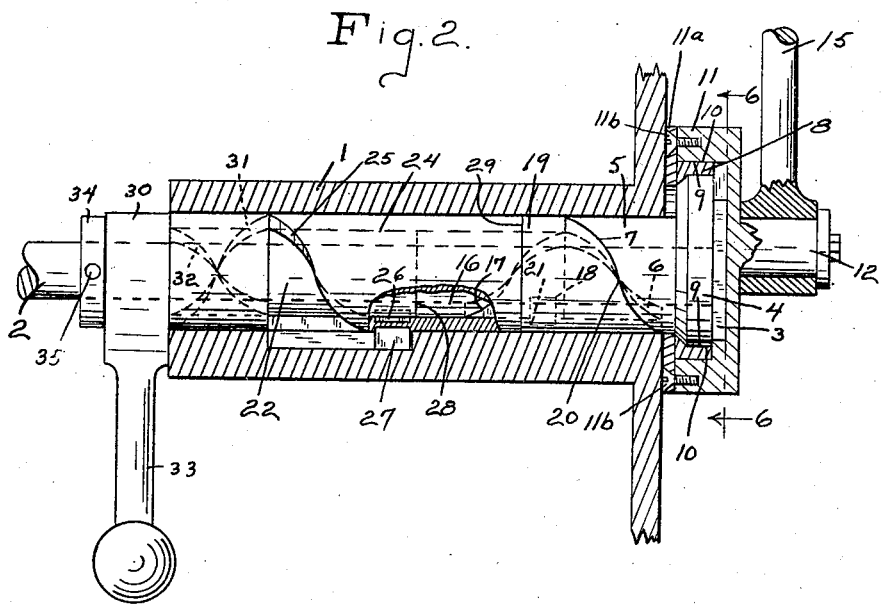
Figure 2 is a view similar to Figure 1 showing the adjusting means in one position of adjustment.
Figure 3:
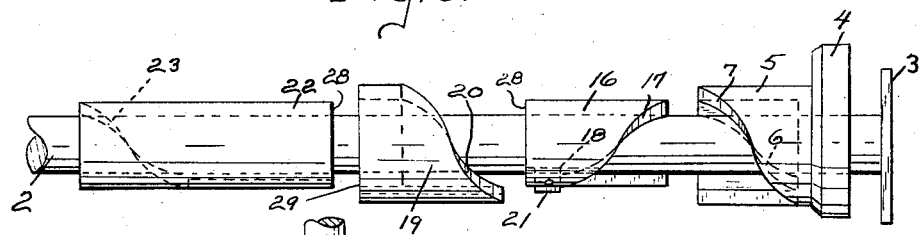
Figure 3 is a view showing portions of the adjusting means in separated relation on the shaft.
Figure 4:
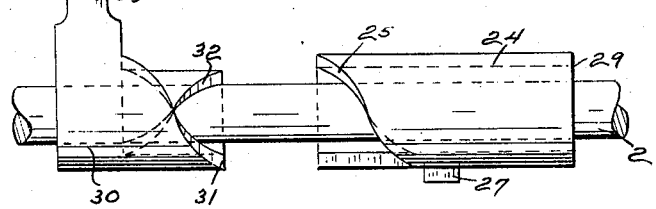
Figure 4 is a view showing other portions of the adjusting means in separated relation on the shaft.
Figure 5:
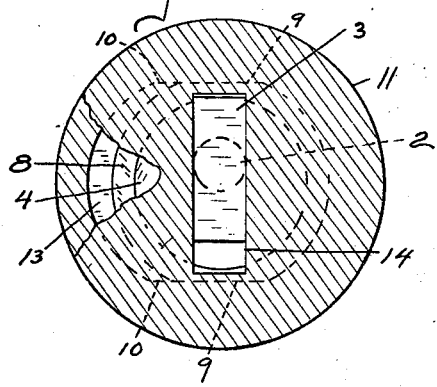
Figure 5 is a sectional view taken on the line 5—5 of Figure 1.
Figure 6:
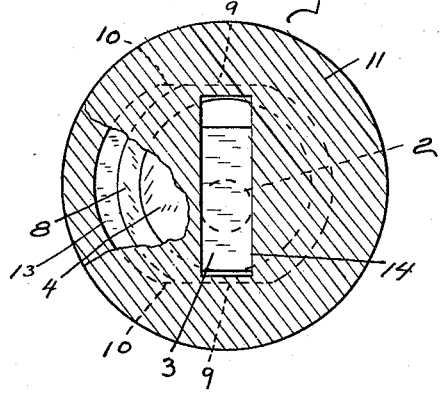
Figure 6 is a sectional view taken on the line 6—6 of Figure 2.

From the foregoing description it will be observed that any degree of rotation of the eccentric or cam 4 relative to the shaft 2 through the member 8 will cause the disk 11 to move radially of the shaft a distance determined by the degree of rotation of the eccentric. As illustrated in Figure 1, the eccentric 4 is positioned to place the crank pin 12 in substantial alignment with the shaft 2. As illustrated in Figure 2, the eccentric 4 is rotated 180 degrees relative to the shaft 2 from its position shown in Figure 1 to thereby place the crank pin 12 at its maximum radial distance from the axis of shaft 2. It is therefore apparent that the crank pin 12 may be moved to any one of an infinite number of positions between axial alignment with the shaft and a predetermined maximum distance from the axis of the shaft thereby determining the extent of reciprocation of a piston or other member, not shown.

Adjacent the sleeve 5 is a sleeve 16 having a cam surface 17 complementary to the cam surface 6 on sleeve 5. The sleeve 16 is slidably journaled on the shaft and is keyed thereto for sliding movement by the key 18. Slidably journaled in the casing 1 and upon the sleeve 16 is an outer sleeve 19 having a cam surface 20 complementary to the cam surface 7 upon sleeve 5. The outer sleeve 19 is slidably keyed to the sleeve 16 by a key 21. Thus it will be seen that the sleeve 16 and the outer sleeve 19 may slide axially of the shaft and of each other.

Slidably journaled upon the shaft 2 is an inner sleeve 22 having a cam surface 23. Slidably journaled within the casing 1 and upon sleeve 22 is an outer sleeve 24 having a cam surface 25. The inner sleeve 22 and outer sleeve 24 are keyed together for relative sliding movement by the key 26 and the outer sleeve 24 is keyed for sliding movement to the casing 1 by a key 27. The inner sleeves 16 and 22 are provided with complementary rotative bearings 28 and the outer sleeve 19 and outer sleeve 24 are provided with complementary bearing surfaces 29. From the foregoing it will be observed that when the shaft 2 is rotated it will carry with it the sleeves 16 and 19. It will also be observed that the sleeves 22 and 24 are fixed against rotation.

Rotatably journaled upon the shaft 2 is a control sleeve 30 provided with an outer cam surface 31 complementary to the cam surface 25 upon the sleeve 24, and with an inner cam surface 32 complementary to the cam surface 23 upon sleeve 22. For manually rotating the control sleeve 30, a handle 33 is provided. For maintaining the several sleeve elements in proper relative alignment, a collar 34 is secured to the shaft 2 by means of a set screw 35 or any other suitable means.

When it is desired to move the crank pin 12 from its position shown in Figure 1, the handle 33 will be moved from its position shown in Figure 1 away from the observer and as a result the cam surface 31 will, through the cam surface 25, cause the sleeve 24 to move axially of the shaft and in turn force the sleeve 19 to rotate the sleeve 5 through the cam surface 7. The sleeve 5 which is caused to rotate in the manner just noted will in turn through the cam surface 6 force the sleeve 16 to move axially of the shaft 2 and in turn cause the sleeve 22 to move within the sleeve 30, the cam surfaces 23 and 32 being complementary. In the illustration of this invention shown in Figures 1 and 2 the rotation of the handle 33 through an arc of 180° causes a similar rotation of the eccentric through the mechanism just described and the ultimate position of the mechanism when the handle is rotated 180° is clearly illustrated in Figure 2.

The modified form shown in Figures 7, 8 and 9 is in all details essentially the same as that form shown in Figures 1 and 2 with this exception, that the disk 11 is provided with a crank pin 12 centrally located upon the disk 11, whereas in the form shown in Figures 1 and 2 the crank pin 12 is offset from the center of the disk. In that form shown in Figures 1 and 2 the crank pin can be moved to one side of the shaft only whereas in the modified form shown in Figures 7 to 9, inclusive, the crank pin may be moved to either side of the shaft 2. In Figure 7 the crank pin 12 is shown in neutral position or axially aligned with the shaft 2. In Figure 8 the crank pin is shown moved to its maximum position above the axis of the shaft 2. In Figure 9 the crank pin 12 is shown moved to its maximum position below the axis of shaft 2. To move the crank pin from the position shown in Figure 7 to the position shown in Figure 8, the handle 33 is moved from its dotted line position shown in Figure 7 downwardly and toward the observer to the position shown in Figure 8. When the crank pin is moved from its position shown in Figure 7 to its position shown in Figure 9, the handle 33 is moved from its dotted line position shown in Figure 7 upwardly and toward the observer to its position shown in Figure 9. All of the mechanism for positioning the crank pin 12 is, as previously noted, identical with the mechanism shown in Figures 1 and 2 with the exception that the crank pin is centrally located on the disk 11 in the modified form and is offset from the center of the disk in the form shown in Figures 1 and 2. In other words, the rotation of the handle through an arc of 180° in the form shown in Figures 1 and 2 will, through the mechanism described, cause the pin to move to one side of the shaft only, whereas in the modified form 180° movement of the handle 33 will, through the mechanism described, cause the crank pin to move from one side of the shaft to the other.

From the foregoing description of the modified form it will be observed that where power is being applied to the shaft through the crank rod 15, such power may, by properly positioning the crank pin relative to the shaft, cause rotation thereof in either direction alternatively.

It is also apparent that the sleeves 16 and 19, while adapted to rotate the cam 4 relative to the shaft, will, by reason of their interaction with the sleeve 5 and their connection with the shaft, maintain the sleeve 5 and cam 4 connected with the shaft 2 for rotation therewith. The shaft 2 when rotated will, through the rectangular block 3, cause the disk 11 to revolve with the shaft which in turn will carry the crank pin through a circular path determined by the position of the crank pin relative to the shaft.

I claim:

1. A shaft, a sleeve carried thereby, an eccentric upon the sleeve, a guide block upon the end of the shaft, a sliding member provided with slots intersecting at 90°, one of which is adapted for engagement with said guide block, a bearing member journaled upon the eccentric and adapted to be engaged within the slot at right angles to the slot engaged by said guide block, and a crank pin carried by the sliding member.

2. In a power transmitting device, the combination with a shaft and reciprocatory elements, of a crank pin movable radially with respect to the shaft, a member carrying said crank pin and keyed to said shaft for rotation therewith and for radial movement with respect thereto, said member being provided with an interior bearing surface, a sleeve rotatably mounted upon the shaft and provided with an eccentric element within said bearing surface, said reciprocatory elements comprising cam sleeves slidable on said shaft and interacting with the first mentioned sleeve for producing rotation of the sleeve relative to the shaft irrespective of the condition of rest or of motion of the shaft.

3. The combination with a casing and a shaft therein, of a sleeve journaled upon the shaft, a pair of concentric sliding sleeves keyed to the casing, a second pair of concentric sliding sleeves carried by the shaft, and a sleeve carried by said shaft and rotatable therewith and relative thereto, said sleeves interacting with each other to produce rotation of the last mentioned sleeve.

4. The combination with a casing and a shaft therein, of a member rotatable with respect to said casing, a pair of sliding sleeves keyed to said casing, means whereby the rotation of said member imparts axial movement to said sleeves, a second pair of concentric sleeves keyed to said shaft and adapted to receive axial movement from said first mentioned sleeves, a member carried by said shaft and rotatable relative thereto, said last named member being adapted to be rotated by the axial movement of the sleeves.

5. The combination with a shaft, of a sleeve journaled upon the shaft, a pair of concentric sliding sleeves provided with means for holding said sleeves against rotation, a second pair of concentric sliding sleeves keyed to the shaft, and a sleeve carried by said shaft rotatable therewith and relative thereto, said sleeves interacting with each other to produce rotation of the last mentioned sleeve.

6. The combination with a shaft, of a member rotatable with respect thereto, a pair of sliding sleeves provided with means for holding said sleeves against rotation, means whereby the rotation of said member imparts axial movement to said sleeves, a second pair of concentric sleeves keyed to said shaft and adapted to receive axial movement from said first mentioned sleeves, and a second member carried by said shaft and rotatable relative thereto, said last named member being adapted to be rotated by the axial movement of the sleeves.

7. The combination with a shaft, of a pair of concentric sliding sleeves provided with means for holding said sleeves against rotation, a second pair of concentric sliding sleeves keyed to the shaft, a sleeve carried by said shaft and rotatable therewith and relative thereto, and means for sliding the first mentioned pair of sleeves simultaneously in opposite directions to produce corresponding movement of the second pair of sleeves, whereby to rotate said sleeve relative to said shaft.

RUDOLPH E. SCHLEY.